United States Patent [19]
Girmay et al.

[11] Patent Number: 5,862,305
[45] Date of Patent: Jan. 19, 1999

[54] LOGIC FILTERS FOR RESOLUTION CONVERSION OF DIGITAL IMAGES

[75] Inventors: Girmay K. Girmay, Las Mirda, Calif.; Robert P. Loce, Webster, N.Y.

[73] Assignee: Xerox Corporation, Stamford, Conn.

[21] Appl. No.: 721,065

[22] Filed: Sep. 26, 1996

[51] Int. Cl.$^6$ .............................. G06K 1/00; G06K 9/36; H04N 1/40
[52] U.S. Cl. ......................... 395/102; 395/101; 395/109; 350/445; 350/447; 382/196
[58] Field of Search .................................. 395/101, 102, 395/109, 105, 112; 358/445, 447, 451, 455, 465, 298, 448; 382/216, 176, 260, 298, 299, 196

[56] References Cited

U.S. PATENT DOCUMENTS

| | | | |
|---|---|---|---|
| 4,437,122 | 3/1984 | Walsh et al. | 358/166 |
| 4,544,264 | 10/1985 | Bassetti et al. | 355/14 R |
| 4,544,922 | 10/1985 | Watanabe et al. | 340/728 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,150,311 | 9/1992 | Long et al. | 395/108 |
| 5,161,035 | 11/1992 | Muramatsu | 358/451 |
| 5,193,008 | 3/1993 | Frazier et al. | 358/298 |
| 5,206,741 | 4/1993 | Shimura et al. | 358/404 |
| 5,270,836 | 12/1993 | Kang | 358/448 |
| 5,359,423 | 10/1994 | Loce | 358/296 |
| 5,479,175 | 12/1995 | Cianciosi et al. | 347/252 |
| 5,689,343 | 11/1997 | Loce et al. | 358/298 |
| 5,742,703 | 4/1998 | Lin et al. | 382/176 |

OTHER PUBLICATIONS

Torey Pines Research; Behind Hewlett Packard's Patent on Resolution Enhancement Technology; (Becky Colgan ed., BIS CAP International); pp. 1–60.

Edward P. Dougherty ed., Mathematical Morphology in Image Processing; Chapter 2 pp. 43–90.

Robert P. Loce et al.; Optimal Morphological Restoration: The Morphological Filter Mean–Absolute–Error Theoren; vol. 3 No. 4, Dec. 1992; pp. 412–432.

Edward R. Dougherty et al.; Optimal Mean–Absolute–Error Hit–or–Miss Filters: Morphological Representation and Estimation of the Binary Conditional Expectation;Day Engineering, vol. 32 No. 4, Apr. 1993, pp. 815–827.

L. Steidel, Technology Overview: Resolution Enhancement Technologies for Laser Printers; pp. 1–14.

Edward R. Dougherty et al.; Optimal Binary Differencing Filters: Design, Logic, Complexity, Precision Analysis, and Application to Digital Document Processing; Journal of Electronic Imaging, vol. 5, No. 1, Jan. 1996.

*Primary Examiner*—Edward L. Coles
*Assistant Examiner*—Mark Wallerson
*Attorney, Agent, or Firm*—Duane C. Basch

[57] ABSTRACT

The present invention is a method and apparatus for logic based resolution conversion and enhancement of digital images. The invention employs a selectively controllable architecture wherein a plurality of input resolutions can be converted to a common output resolution. The system has particular use in highlight color systems, wherein the highlight color data may be processed separately for each color plane, using the present invention, and then recombined to produce enhanced highlight color output. Moreover, the hardware preferably employs an interlocked area mapping technique to produce the resolution converted bit planes of digital image data.

9 Claims, 6 Drawing Sheets

LOGIC FILTERS FOR RESOLUTION CONVERSION OF DIGITAL IMAGES

The invention relates generally to an architecture and processing method and more particularly to logic filtering operations that are employed to produce a digital output image at a predetermined resolution from input images having one of a plurality of input resolutions.

CROSS REFERENCE

The following related application is hereby incorporated by reference for its teachings: "VIDEO PATH ARCHITECTURE INCLUDING LOGIC FILTERS FOR RESOLUTION CONVERSION OF DIGITAL IMAGES," Robert P. Loce et al., Application No. 08/XXX,XXX, filed concurrently herewith. (D/95498)

BACKGROUND AND SUMMARY OF THE INVENTION

The present invention is directed to digital printing systems that handle numerous document and data formats. Such systems are preferably open systems where devices from different manufacturers are integrated to provide solutions to customers' needs. A key feature in such printing systems is enabling electronic documents from various sources to be printed on output devices. In order to achieve device-independence efficient methods of image resolution conversion or enhancement are required. Hence, raster conversion technology, where a bitmap created for a first output device (e.g., at 240 spots per inch) is altered so as to be adequately rendered by an output device having a different resolution, is a very important aspect of the open system technology.

Digital documents created on mainframe or similar legacy computer systems may be digitized at resolutions as low as 240 spots per inch (spi). However, many modern printers operate at 300 spi or 600 spi and it is desirable to enable artifact-free printing of these 240 spi source images on 300 or 600 spi printers. While it is known to accomplish resolution conversion using bit or pixel-level conversion (e.g., bit replication), as employed in the Xerox DocuTech Production Publisher and Xerox 4850/4890 Highlight Color Printers, the present invention enables device-independent printing using an area mapping technique during image processing to enhance binary input images having a first resolution and producing images having a second resolution while reducing or eliminating image distortions upon printing.

Heretofore, resolution enhancement has been accomplished using various techniques, including those described in the following disclosures which may be relevant:

Torrey Pines Research, *Behind Hewlett-Packard's Patent on Resolution Enhancement™ Technology,* (Becky Colgan ed., BIS CAP International, 1990) pp. 1–60.

James C. Stoffel et al., *A Survey of Electronic Techniques for Pictorial Image Reproduction,* IEEE Transactions on Communications, Vol. COM-29, No. 12, December 1981.

L. Steidel, *Technology Overview: Resolution Enhancement Technologies for Laser Printers,* LaserMaster Corp.

U.S. Pat. No. 4,437,122 to Walsh et al., issued Mar. 13, 1984, teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,841,375 to Nakajima et al., issued Jun. 20, 1989, discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. 4,847,641 (issued Jul. 11, 1989) and U.S. Pat. No. 5,005,139 (issued Apr. 2, 1991) to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,539,866 (issued Jul. 23, 1996) to Banton et al. teaches increasing the resolution of a binary input image to be printed by an electronic printing system. The method includes storing a portion of the binary input image and determining the binary state of a central pixel and a plurality of pixels neighboring the central pixel and comparing the states of the central pixel and the neighboring pixels to a predefined template. Based upon the comparison, the method detects when a match occurs a multi-bit digital signal is generated as a value associated with the predefined template and the multi-bit digital signal is converted into a resolution enhanced output pixel for printing by the system.

U.S. Pat. application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics.

The following pending patent applications describe image resolution conversion methods employing morphological processes: appl. No. 08/169,487 by Loce et al. (filed Dec. 17, 1993) and corresponding Japanese Patent Appl. No. 7,226,884 on Aug. 22, 1995, and appln. No. 08/451,376 (filed May 23, 1995), both of which are assigned to the assignee of the present application.

Publication by Edward Dougherty et al. "Optimal binary differencing filters: design, logic complexity, precision analysis, and application to digital document processing," Journal of Electronic Imaging, Jan. 1996. Vol 5, no. 1, p 66–86, discloses statistical and logical properties of template-matching filters. Also disclosed are design methods for optimal template matching filters for digital document restoration and resolution conversion and enhancement.

In accordance with the present invention, there is provided a method for processing a highlight color digital input image signal representing a highlight color image, comprising the steps of: quantization slicing the input image signal to produce at least a first binary image and a second binary image; passing, in parallel channels, each of the first and the second binary images through a binary, template-based resolution conversion operation to yield an intermediate image, wherein the intermediate image is a high-addressability image; arbitrating between the intermediate image available on the parallel channels and associating a marker with each pixel of the intermediate image, said marker indicating the result of the arbitrating step; passing the intermediate image and associated markers to a lookup table, wherein the lookup table outputs, in response to the image pixel and associated marker a digital signal suitable for driving a pulse-width, position modulated marking engine.

One aspect of the invention is based on the discovery of a new technique for improving the image quality of resolution enhanced images, and in particular highlight color images. The techniques of the present invention are intended to enable the processing of highlight color images wherein the techniques increase the resolution of an input image to a common resolution of a highlight color output device while preserving local average density, stroke or line width and edge position in the output image.

Such techniques can be implemented, for example, by an image processor working in conjunction with a highlight color printing system. For example, a machine implementing the invention can include the Xerox® 4850 Laser Printing System or 4890 Highlight Laser Printer.

One aspect of the invention is based on the observation of problems with conventional resolution conversion techniques, particularly techniques that result in strong halftone moiré when converting from 240 spi input to 300 spi output. This aspect is based on the discovery of a technique that alleviates these problems by employing a computationally simple, moiré-free conversion. This technique can be implemented, for example, using interlocked area mapping techniques and pixel averaging in an image processing architecture designed to provide highlight color image processing.

The techniques described herein are advantageous because they are computationally efficient, simple and do not require modifications to the output device to achieve the improved image quality. The present invention, therefore, may be adapted to any of a number of output devices where open systems interfaces require the receipt and rendering of images having various resolutions.

Figure 1:
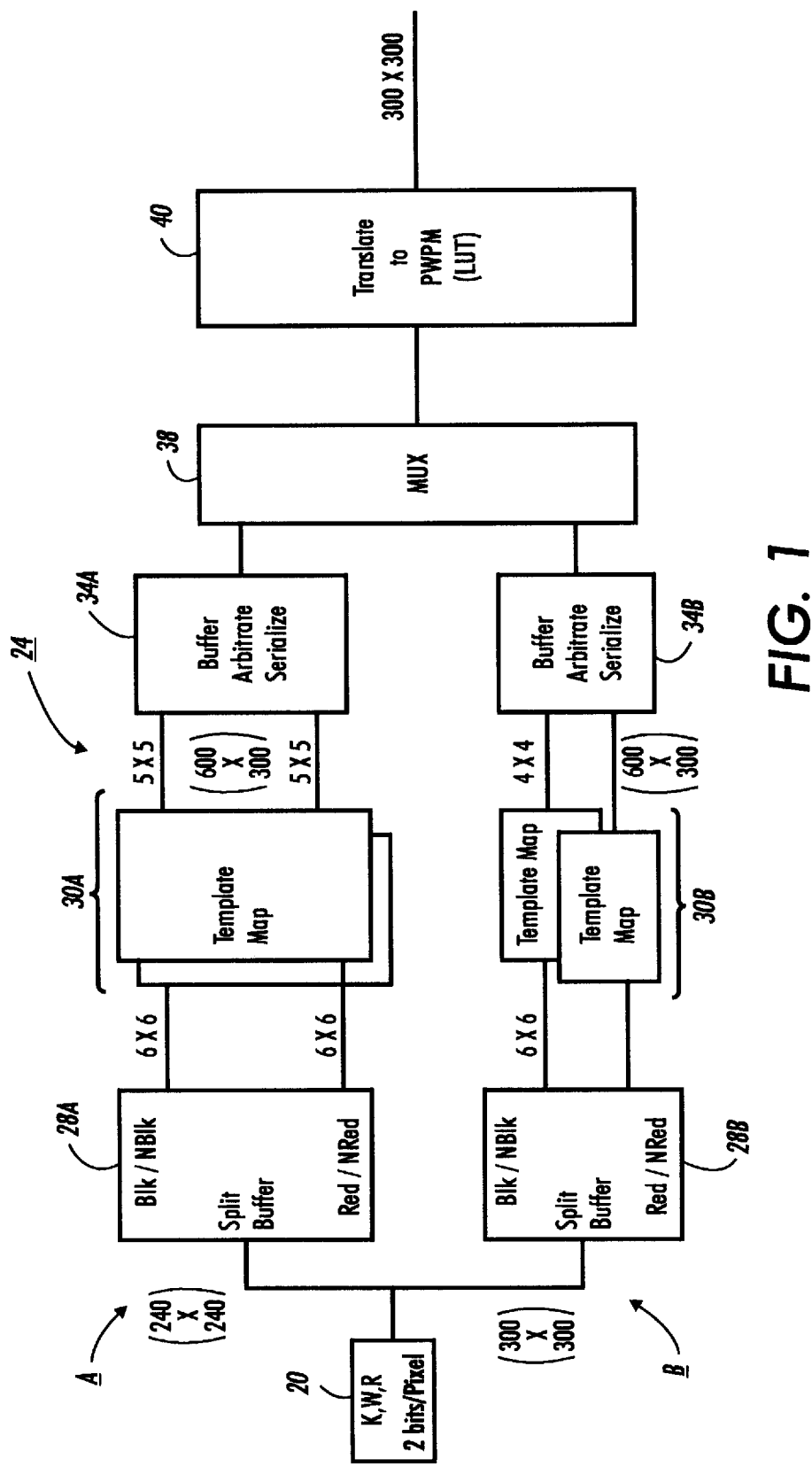
FIG. 1 is a block diagram of a system implementing logic filtering operations in accordance with an aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. For example, a binary item of data, also referred to as a "bit," has one of two values, interchangeably referred to as "1" and "0" or "ON" and "OFF" or "high" and "low."

A "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. A "data processing system" is a physical system that processes data. A "data processor" or "processor" is any component or system that can process data, and may include one or more central processing units or other processing components.

A "logic operation", for example an operation accomplished using a logic circuit, is an operation that obtains a result using each bit of an operand independent of values of other bits of the operand. NOT is an example of a logic operation that uses one operand. OR, AND, and XOR are examples that use two or more operands.

An item of data "defines" an image when the item of data includes sufficient information to produce the image. For example, a two-dimensional array can define all or any part of an image, with each item of data in the array providing a value indicating the color of a respective location of the image. Each location in an image referred to herein as a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image.

Pixels are "neighbors" or "neighboring" within an image when there are no other pixels between them and they meet an appropriate criterion for neighboring. For example, if the pixels are rectangular and appear in rows and columns, each pixel may have 4 strongly connected neighbors, 4 weakly connected neighbors, r 8 connected neighbors, or neighbors defined by a window.

An "image input device" or "image input terminal" (IIT) is a device that can receive an image and provide an item of data defining a version of the image. A "scanner" is an image input device that receives an image by a scanning operation, such as by scanning a document.

An "image output device" or "image output terminal" (IOT) is a device that can receive an item of data defining an image and provide the image as output. A "display" and a "printer" are both image output devices that provide the output image in human viewable form. The visible pattern presented by a display is a "displayed image" or simply "image."

Turning now to FIG. 1, illustrated therein is a block diagram of a system for implementing logic filtering enhancement on a highlight color image. As will be appreciated by those skilled in the art, a highlight color image at a point within the image rendering circuitry typically comprises a pair of binary images, each a different color, superposed with respect to one another. Often such images employ a black image and an alternate color image such as red. Hereinafter, the highlight color image may be referred to as having three components, black (K), red (R) and a white or non-printed regions (W).

As seen in FIG. 1, the highlight color inputs K, W and R are supplied in a 2-bit/pixel format, where three of the four levels are used to indicate a white, red, or black mark for a given pixel. Any number of image input terminals may be employed to produce the K, W, R input information, including printing systems designed for mass mailing or billing purposes where customized colors or logos are printed on non-preprinted stock.

In the embodiment depicted in FIG. 1 the highlight color inputs 20 are directed, depending upon the input resolution, into one of two distinct channels in the image processing system 24. In particular, channel A is intended to handle 240 spi input and channel B 300 spi input. Once directed to the appropriate channel, the general processing methodology continues in essentially the same manner in each channel. Accordingly, the following description will be directed to a single channel, channel A. At split buffer 28A, the K, W, R signals are divided or split into two bit planes indicated as Blk/NBlk (Black/NOT Black) and Red/NRed. Essentially, the split buffer splits the 2-bit/pixel input into two distinct bits, one for each of the two colors in the highlight color system. Bit-slicing or level-slicing (threshold-based) are quantization slicing techniques employed to separate the signals. The single-color plane pixel values (data) are then fed, in parallel to template maps 30A, where an area mapping process is employed to convert the pixels at an input resolution of 240×240 spi to an output resolution of 600×300 spi as will be described with respect to FIG. 2.

Once mapped to the output resolution, the high addressability output (where each ⅟300" output pixel is represented by 2 bits in the fast-scan direction), having been grouped into 2-bits per pixel is passed to arbitration/serialization block 34A. At block 34A the arbitration process selects the output color should both the black and red planes indicate a pixel is to be marked. In one embodiment the arbitration may be to simply select the black pulse in the case of all conflicts. However, other arbitration schemes may be employed, for example the arbitration circuit, such as disclosed by Cianciosi et al. in U.S. Pat. No. 5,479,175 "Method and Apparatus for Enhancing Discharged Area Developed Regions in a Tri-level Printing System", hereby incorporated by reference, may be employed to select between the enhanced resolution black or highlight color output pixels. In one embodiment, the arbitration, step may associate an arbitration marker with the output so as to indicate the results of the arbitration. It will be appreciated that the use of an arbitration result marker or the actual selection of the black or red output are equivalent and one or the other means for arbitration may be employed depending upon the hardware embodiment or subsequent processing necessary. After arbitration, the bit-stream is serialized using a buffering capability also found within block 34A, so that the area mapped output pixels can be output from block 34A as a serialized stream of bits. It will be understood by those skilled in the art of digital image processing that a buffering operation is necessary in order to take a block or array of image pixels that have been mapped and convert them into a stream of data representing a series of scanline delimited rasters for rendering by an image output terminal.

Having produced the serialized high-addressability output 600×300, the data is passed through MUX 38, where the channel output, A or B, is selected based upon the input resolution. The output of MUX 38 is then passed to PWM translation block 40, where the resolution converted, high-addressability data is translated to pulse-width modulated output signals as described by Cianciosi et al. in U.S. Pat. No. 5,479,175. For example, the image data and associated markers (e.g., arbitration) may be passed to a look-up table (LUT) 40, wherein the lookup table outputs, in response to the image pixel and associated markers a digital signal suitable for driving the pulse-width, position modulated marking engine. The possible outputs resulting from the production of high-addressability output being: white, black, black-left (gray1), black-right (gray2), red, red-left (pink1) and red-right (pink2) and perhaps even combinations of pink and gray. This is an enhanced range of output states relative to the K, W and R previously produced by highlight color systems.

Figure 2:
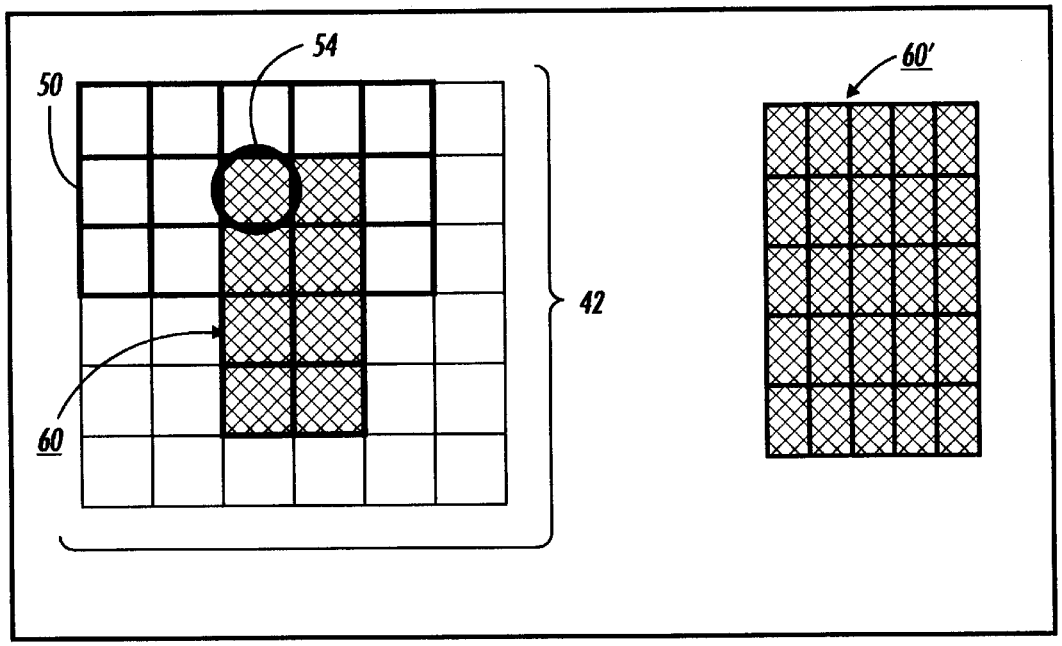
FIG. 2 is an illustration of an exemplary template-based mapping window and the relationship between the window and an area mapping region.

Having described the basic operation of an embodiment of the present invention, attention is now turned to FIG. 2 which is an illustration of an exemplary template-based mapping window 50 and the relationship between the window and an input pixel region 60. More specifically, the mapping operation carried out in the template mapping blocks 30 in FIG. 1 are accomplished using a 6×6 observed window of input pixels 42 as seen in FIG. 2. Within the observed window, a smaller input mapping region 60 is employed. In the 240 spi to 600×300 spi conversion illustrated by FIG. 2, the 2×4 input pixel mapping region 60 is employed to produce the 5×5 output pixel mapping region 60', wherein each input pixel maps to approximately 3⅛ high addressability output pixels. It will be appreciated that template-based techniques may be employed to determine the output states of one or more of the pixels within output pixel mapping region 60'. As illustrated a template-based mapping window 50 may be employed as indicated to determine the output state for all output pixels that map to the input pixel indicated by the circle 54 in FIG. 2.

Figure 3:
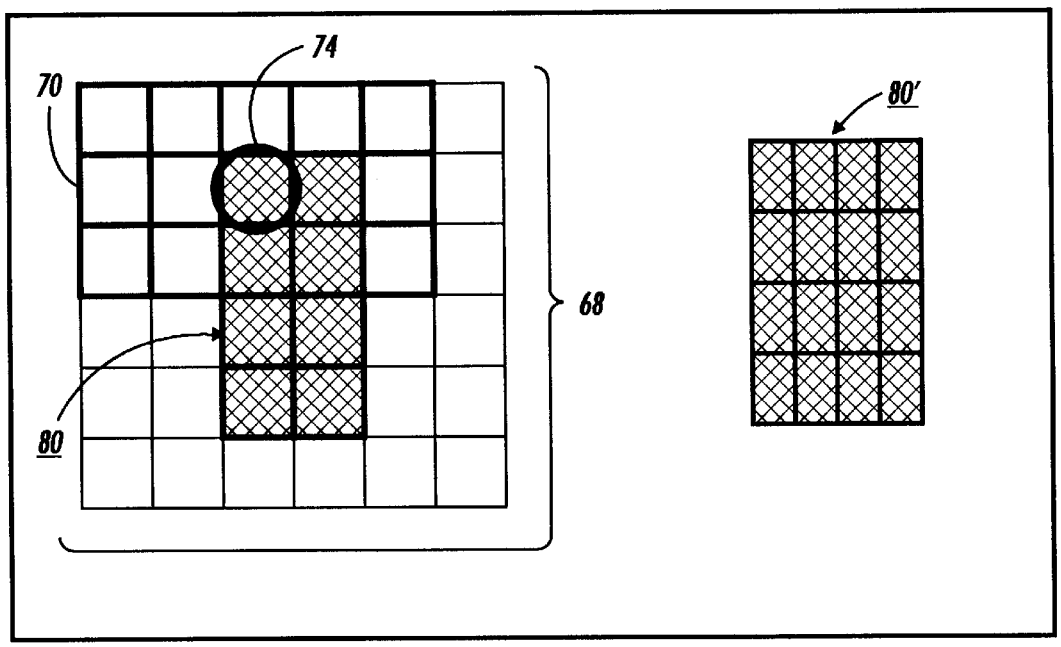
FIG. 3 is another illustration of an exemplary template-based mapping at an input resolution different than that of FIG. 4.

In a similar manner, FIG. 3 illustrates template-based mapping at an input resolution of 300 spi—as would be processed in accordance with the steps previously described, but through channel B of FIG. 1. Specifically, FIG. 3 depicts a 6×6 observation window 68. Within the window, a 2×4 input mapping region 80 is employed to produce the 4×4 output pixel mapping region 80' (each input pixel mapping to 2 output pixels).

Figure 4:
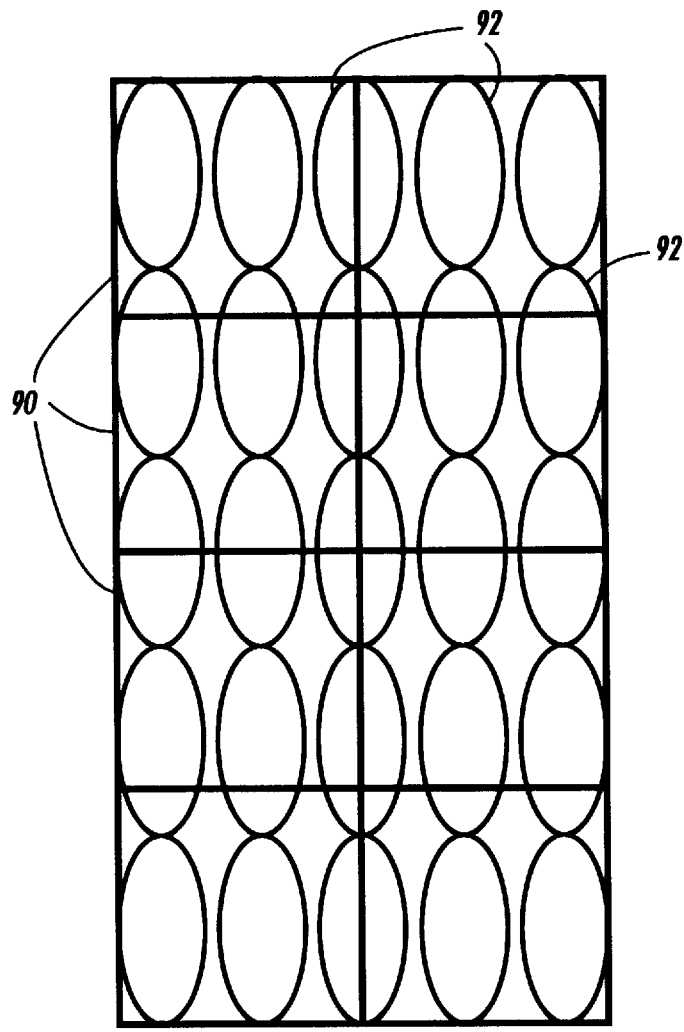
FIG. 4 is an illustration of an exemplary area mapping region.

Turning now to FIG. 4, there is illustrated an area mapping region for the 240 spi to 600×300 spi resolution conversion operation accomplished in blocks 30A of FIG. 1. In FIG. 4 the positions of the input pixels are outlined as rectangular areas 90 whereas the output pixels are indicated by elliptical regions 92. As will be observed, there are approximately 3 ⅛th output pixels for each input pixel. Moreover, various output pixels are split between one or more input pixel positions so as to make the operation of image-artifact-free mapping input pixels to output pixels more difficult, but enabling the use of interlocked mapping techniques such as those described by R. Loce in application Ser. No. 08/451,376, hereby incorporated by reference, to avoid the objectionable image quality obtained with well-known bit-replicating resolution conversion techniques.

Figure 5:
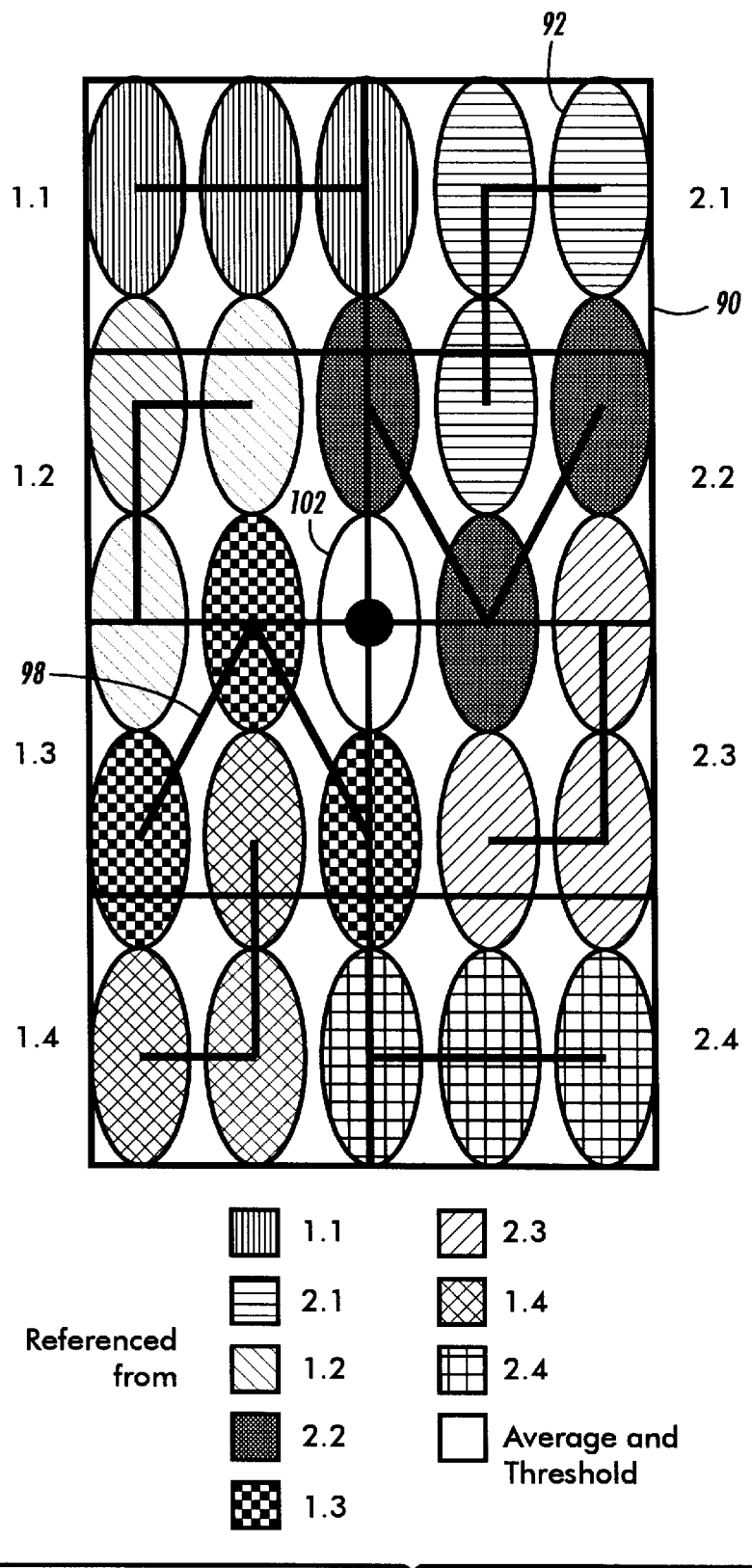
FIG. 5 is an illustration of the area mapping region of FIG. 4 with further indications of the mapping between input and output pixels in accordance with an embodiment of the present invention.

FIG. 5 depicts the interlocked mapping that is preferably employed as an aspect of the present invention. Referring to FIG. 5, each of the eight input pixels 90 has been assigned a reference number in the form column.row. For example, the upper left input pixel is in the first column, first row position and is identified by the reference numeral 1.1. Most of the output pixels 92 have been mapped or related to one of the input pixel positions and the mapping is indicated by various fill patterns within the output pixel ellipsis. The output pixels within the 5×5 array are referred to hereafter as a cluster. The individually grouped sub-clusters, subsets of the cluster, each contain only those output pixels that will be mapped to a common input pixel value. As will be seen, there are a total of eight sub-clusters within the 5×5 array of output pixels. To further illustrate the interlocked aspects of the mapping operation, the centers of the pixels within each sub-cluster have been connected by a bold line, for example line 98. As indicated by the bold lines connecting output pixels with the sub-cluster it is apparent that adjacent sub-clusters preferably do not have a common shape. The non-symmetrical nature of adjacent sub-clusters is preferred so as to avoid adding structure to the output image. Mirror or rotation orientations of the preferred cluster scheme are also equally preferable.

Although the sub-clusters account for the majority of the output pixels, it will be appreciated that because of the equality in the numbers of pixels in each sub-cluster there are pixels not associated with any sub-cluster. In the example illustrated in FIG. 5, the non-associated or remainder pixel 102 is positioned in the center of the 5×5 array. The output state of remainder pixel 102, or for that matter any remainder pixel, is preferably determined so as to preserve the average density of at least the local region surrounding the remainder pixel. In accordance with the present invention, the remainder pixel output value is determined by first averaging the density of at least two input pixels to determine a local average and then binarizing the average value and setting the remainder pixel equal to the result of the binarization operation. In particular, a preferred method of arriving at the output value for pixel 102 would be to average the values for the four input pixels in the center of the 2×4 input pixel array, and then apply a threshold to determine whether the high-addressability output should be a mark (e.g., black or red) or no mark (e.g., white). Although a threshold has been described as the binarization operation, it will be appreciated that any number of possible techniques may be employed, including forms of halftoning-based thresholding. By averaging the input pixels, the present area mapping operation maintains the average image density for the local region of the image. By employing an interlocked arrangement for the sub-clusters, the area mapping operation not only preserves stroke and line width and position, but also eliminates the potential for objectionable moiré as a result of the resolution conversion. A less costly treatment of pixel 102 simply includes it within a neighboring cluster.

Having described one embodiment of the present, attention is now turned to an alternative embodiment of the resolution conversion apparatus and method previously described. In particular, reference is made to FIG. 6 which is a block diagram illustrating a system capable of accomplishing the resolution conversion of a plurality of different input resolutions to produce a primary output resolution. The alternative embodiment preferably substitutes the circuitry represented in FIG. 6 for the template map blocks 30 in the embodiment of FIG. 1. In particular, the template map blocks take a region of the input pixels and map the values of the pixels to a plurality of output pixels. However the system depicted in FIG. 1 requires distinct channels for each input resolution. The alternative depicted in FIG. 6 takes the input image data (M) over a 2×4 region (e.g., 8 bits per color plane) on lines 120 and applies the template-based mapping logic at block 124 previously described to produce outputs for a plurality of output pixels ($N_0$–$N_{24}$) on lines 128 at a higher resolution. The values for each of the output pixels is, for example, determined based upon the mapping technique previously described with respect to FIG. 5 and all outputs are provided to the selection and buffering block 132. In a simplified representation, block 132 operates to latch or otherwise buffer the signals on lines 128 and then select the outputs to be employed to generate the appropriate number of output pixels for the given resolution conversion, preferably using combinatorial logic. Operation of the selection block is accomplished as a result of an input received from selection logic block 136. Selection logic block 136 receives as input the resolution of the input image and produces a combinatorial logic output signal which controls the selection of various signals buffered within block 132. The resultant output from block 132 is a plurality of output pixels that may be further processed as previously described with respect to FIG. 1.

Figure 6:
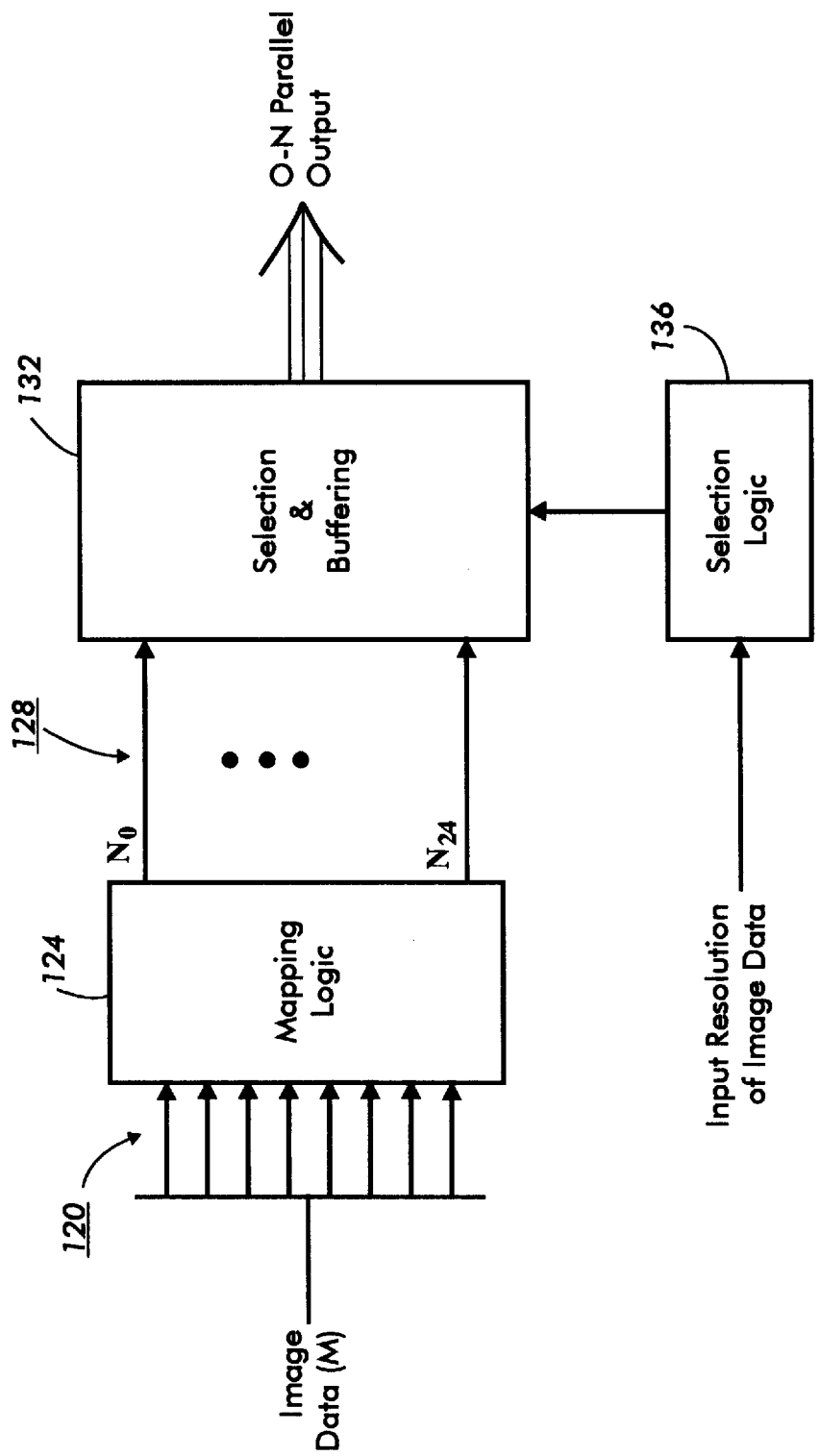
FIG. 6 is a block diagram illustrating an aspect of an improved system capable of accomplishing the resolution conversion of a plurality of different input resolutions so as to produce a primary output resolution in accordance with area mapping techniques.
Figure 7:
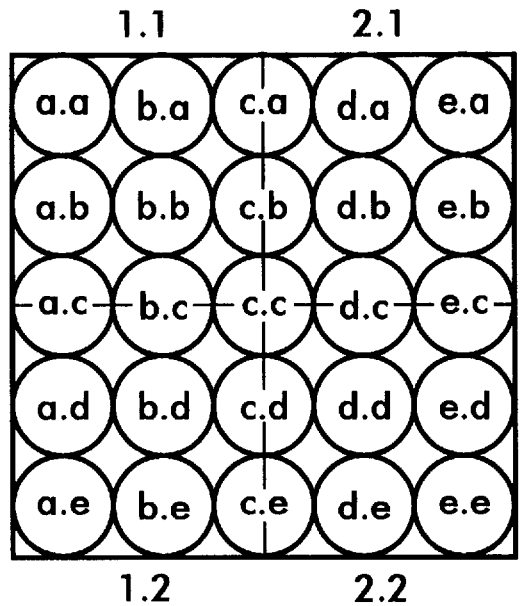
FIG. 7 illustrates an area mapping region for accomplishing an exemplary 240 spi to 600 spi resolution conversion in accordance with the system depicted in FIG. 6.

To further illustrate the operation of the alternative embodiment, reference may be had to FIG. 7 which illustrates an area mapping window for accomplishing an exemplary 240 spi to 600 spi resolution conversion in accordance with the system depicted in FIG. 6. In particular, the rectangular input pixel positions are labeled using numerals for the column.row designation as previously described. Similarly, the output pixel positions use alphabetical column.row notation. As will be appreciated from the discussion directed to the embodiment of FIG. 1, the state or value for each output pixel or group of output pixels may be determined using a template-based technique, for example those techniques described by Loce et al. in U.S. Pat. No. 5,359,423 to Loce for a Method for Statistical Generation of Density Preserving Templates for Print Enhancement, issued Oct. 25, 1994 or the paper by Edward Dougherty R. Loce entitled "Optimal Binary Differencing Filters: Design, Logic Complexity, Precision Analysis, and Application to Digital Document Processing" cited previously. In all cases, the output pixel is defined as the result of logical operations performed on one or more input pixels surrounding a target input pixel (I) at location X.X. Accordingly, the output (O) of pixel at position x.x could be represented as:

$$O_{x.x} = f_{logic}(I_{X.X}, I_{X-1.X}, I_{X.X-1}, \ldots),$$

where $f_{logic}$ is a template-based logic operation associated with the particular output pixel position.

Figure 8:
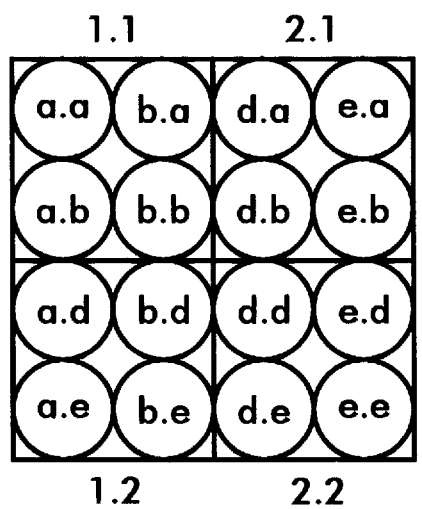
FIG. 8 illustrates an area mapping region for accomplishing an exemplary 300 spi to 600 spi resolution conversion in accordance with the system depicted in FIG. 6.

As will be further appreciated by one skilled in the art, the logic operations and hardware necessary to perform such operations may be implemented in an application specific integrated circuit or gate array device. To capitalize on the hardware invested to implement the various template-based operations, the embodiment of FIG. 6 would be employed to produce a plurality of 600 spi output pixel values as indicated in FIG. 7, such as a.a, b.d or e.c. However, as shown in FIG. 8 an exemplary 300 spi to 600 spi resolution conversion may also be accomplished using the same logic used to produce the twenty-five output pixels of FIG. 7.

For example, 600 spi output pixel a.a in FIG. 7 is likely to be generated primarily as a logical function of 240 spi input pixel 1.1. Similarly, 600 spi output pixel a.a in FIG. 8 is likely to be produced by the same logical function applied to 300 spi input pixel 1.1 in FIG. 8. Thus, the same hardware within the mapping logic block 124 of FIG. 6 can be employed to produce both of the a.a output pixels found in FIG. 7 or FIG. 8. Thus, as depicted in FIG. 8, sixteen of the twenty-five outputs generated by mapping logic block 124 are preferably employed to produce the outputs for the 300 spi to 600 spi conversion represented therein. Those skilled in the art will recognize that such a system is extendible so as to allow the conversion of a multitude of input resolutions to a common output resolution, the primary difference being one of controlling the speed and synchronization of the logic operations as a function of the input and output resolution. Moreover, the advantageous interlocked mapping applied as indicated with respect to FIG. 5 may also be employed in the compacted implementation scheme of FIG. 6 so as to provide an improved rendition of the resolution converted image with a hardware minimized system capable of converting a plurality of input resolutions to a common output resolution.

In recapitulation, the present invention is a method and apparatus for logic based resolution conversion of digital images. The invention employs an interlocked area mapping technique to provide one or more resolution converted bit planes of digital image data. The system has particular use in highlight color systems, wherein the highlight color data may be processed separately for each color plane, using the present invention, and then recombined to produce enhanced highlight color output.

It is, therefore, apparent that there has been provided, in accordance with the present invention, a method and apparatus for resolution conversion of digital image data. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for processing a highlight color digital input image signal representing a highlight color image, comprising the steps of:

quantization slicing the input image signal to produce at least a first binary image with a resolution $R_1$ and a second binary image with a resolution $R_1$;

selecting, from a region of neighboring pixels within the first binary image, a first set of input pixels to be converted;

mapping, using a binary, template-based conversion operation, the first set of input pixels to a first intermediate set of pixels at a high resolution $R_3$, where $R_3$ is greater than $R_1$;

selecting from the first intermediate set of pixels a first set of output pixels to produce an image segment of resolution $R_2$, where $R_2$ is greater than $R_1$ and not greater than $R_3$; wherein the selection is accomplished as a function of the input resolution $R_1$;

selecting, from a region of neighboring pixels within the second binary image, a second set of input pixels to be converted;

mapping the second set of input pixels to a second intermediate set of pixels at a high resolution $R_3$;

selecting from the second intermediate set of pixels a second set of output pixels to produce a second image segment of resolution $R_2$, wherein the selection is accomplished as a function of the input resolution $R_1$;

arbitrating between the first and second image segments to produce an output image; and passing the output image to a lookup table, wherein the lookup table outputs, in response to the output image a digital signal suitable for driving a pulse-width, position modulated marking engine to produce the highlight color image.

2. The method of claim 1, wherein the quantization slicing of the input image signal is accomplished using a process selected from the group comprising:

bit slicing; and level slicing.

3. The method of claim 1, wherein the mapping step comprises applying a binary, template-based conversion operation to the second set of input pixels, said operation identifying pixel patterns within the second set of input pixels matching predefined template patterns and outputting a plurality of pixels at resolution $R_3$ in response to a match.

4. An apparatus for processing a digital input image having a low resolution $R_L$ to produce a high resolution output image having a fixed resolution $R_H$ comprising:

windowing means for selecting, from a region of neighboring pixels within the input image, a set of input pixels to be converted;

mapping logic for mapping the set of input pixels to an intermediate set of pixels at a higher resolution $R_I$, where $R_I$ is greater than $R_L$ and where $R_I$ is not greater than $R_H$;

a buffer for temporarily storing the intermediate set of pixels; and selection logic, generating as a function of the input resolution $R_L$ and the fixed output resolution $R_H$ a selection signal, said selection signal being used in conjunction with the buffer so as to select from the stored intermediate set of pixels a set of output pixels to produce an image segment of resolution $R_H$, wherein the selection is accomplished as a function of the input resolution $R_L$.

5. The apparatus of claim 4, wherein said mapping logic performs a binary, template-based conversion operation on the set of input pixels.

6. The apparatus of claim 5, wherein said low resolution is one of a plurality of low resolutions that may be processed by the apparatus.

7. The apparatus of claim 6, wherein said high resolution output image has a resolution of at least 600 spots per inch.

8. The apparatus of claim 7, wherein said low resolutions are not greater than 480 spots per inch.

9. The apparatus of claim 8, wherein said low resolution is selected from the set of input of resolutions consisting of: 240, 300, 400 and 480 spots per inch.

* * * * *